Dec. 13, 1949     H. PHILLIPS     2,490,918
APPARATUS FOR USE IN TRANSMITTING ANGULAR MOVEMENT
Filed Feb. 28, 1946     6 Sheets-Sheet 5
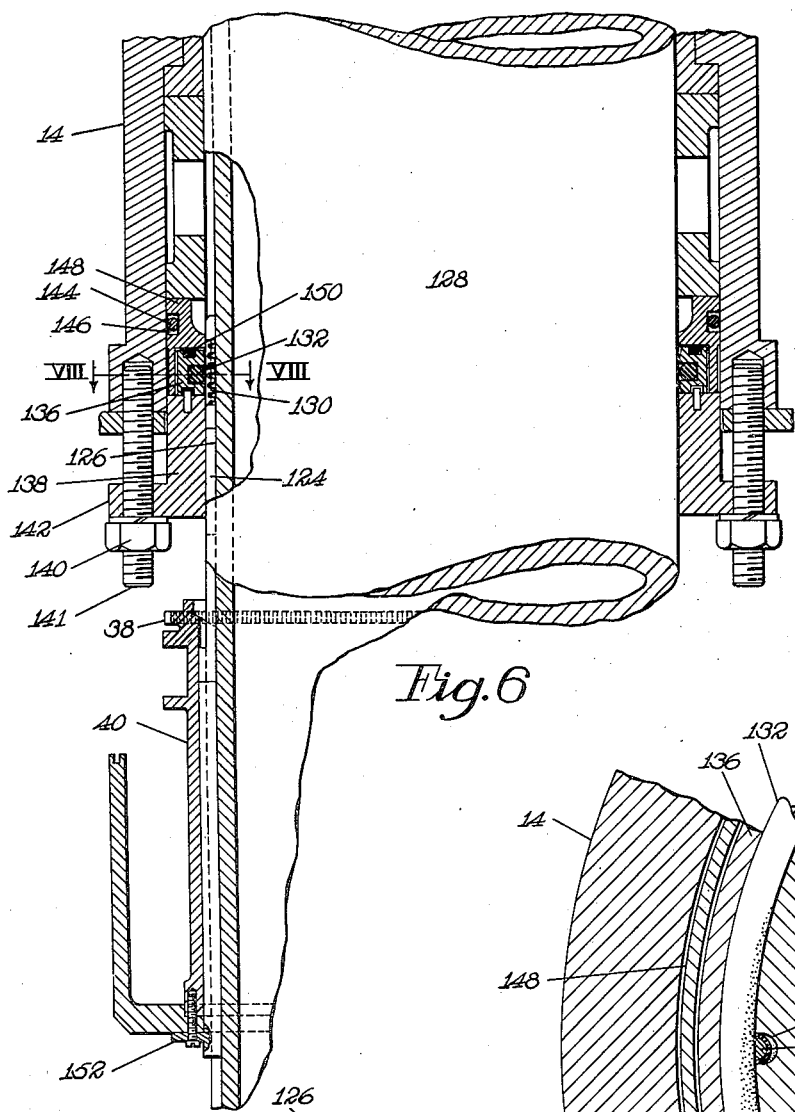
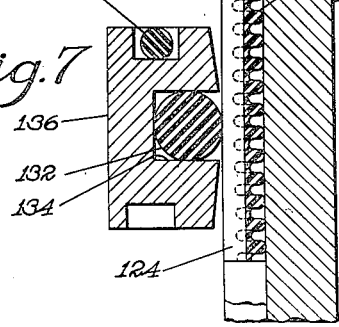
Inventor
Harry Phillips
By his Attorney Patented Dec. 13, 1949

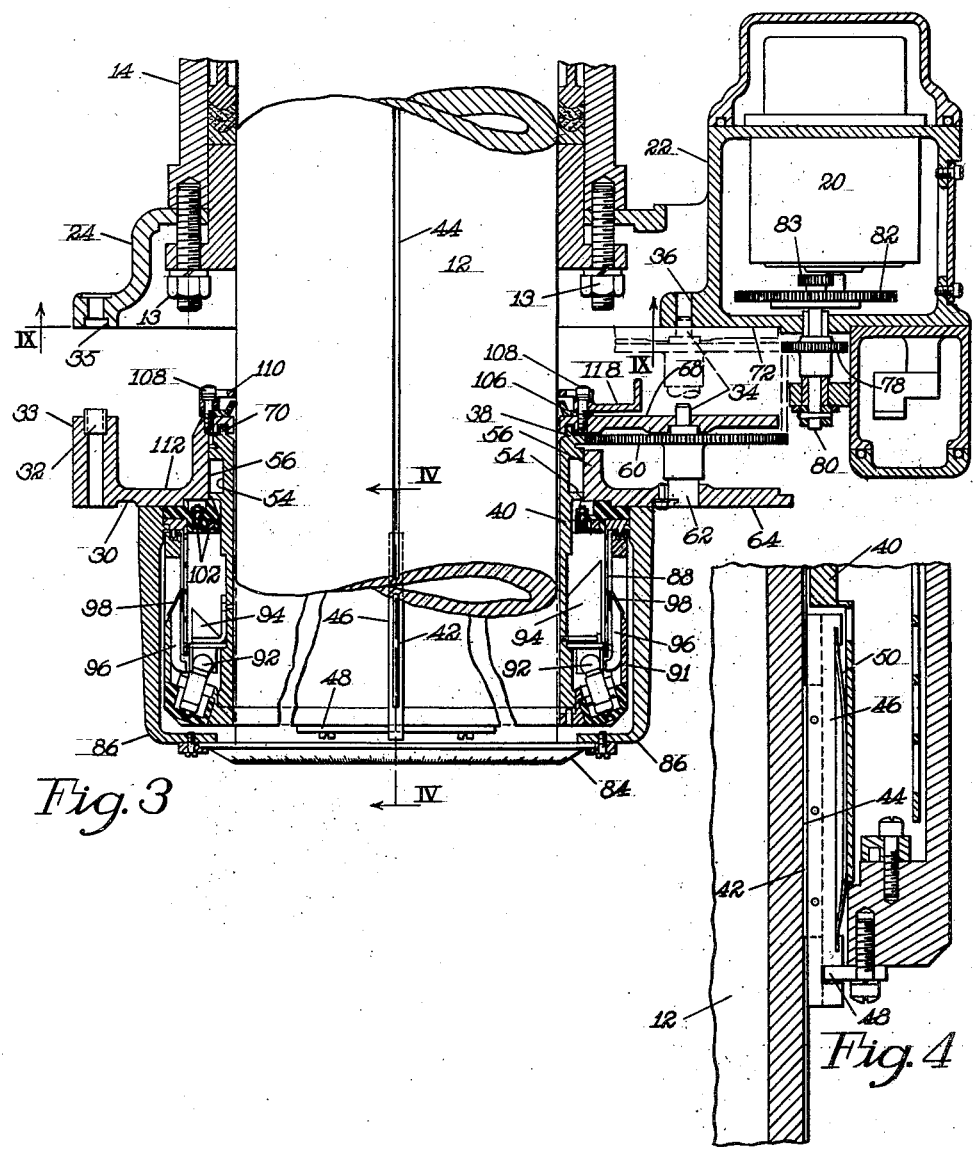

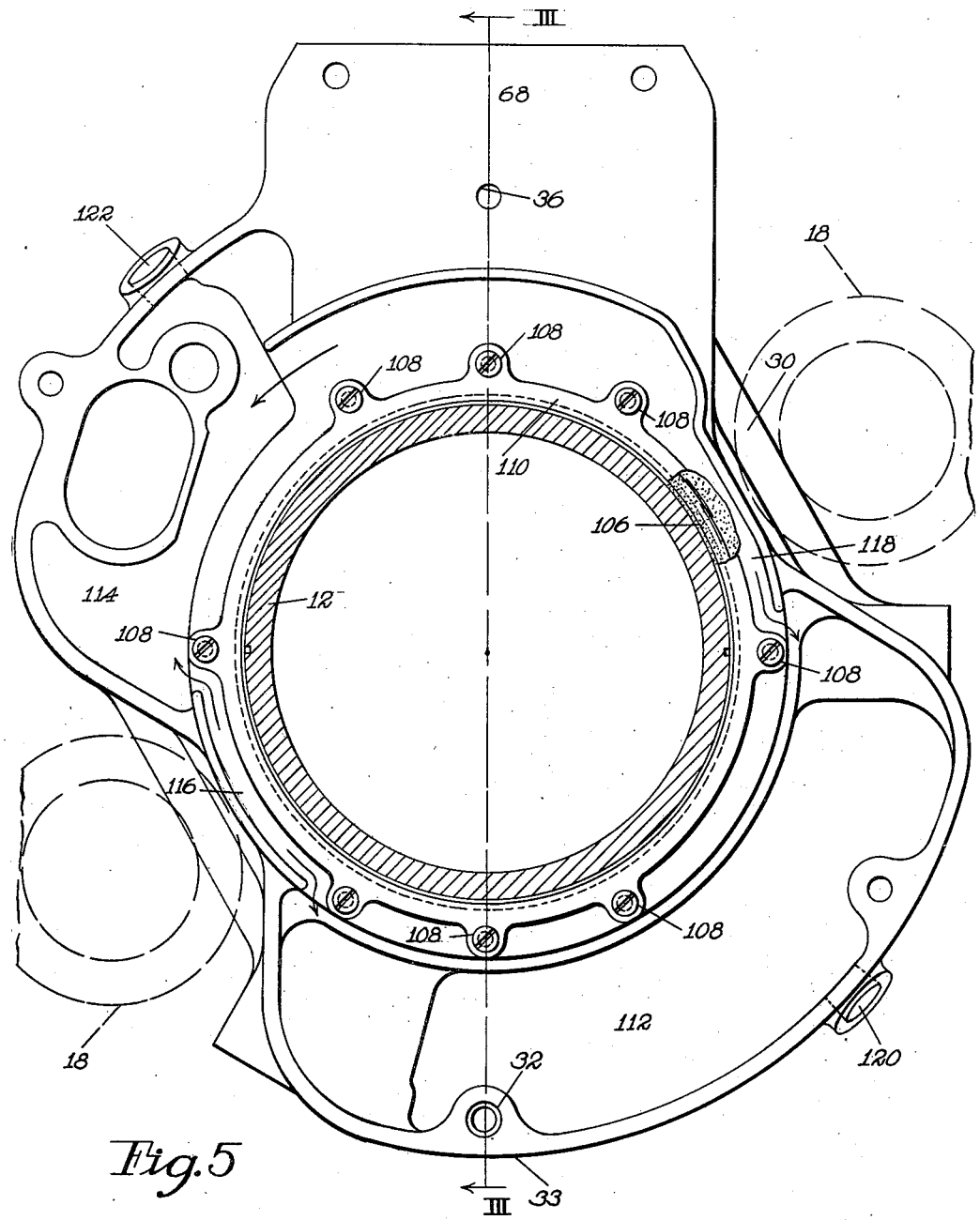

2,490,918

UNITED STATES PATENT OFFICE 2,490,918

APPARATUS FOR USE IN TRANSMITTING ANGULAR MOVEMENT

Harry Phillips, Beverly, Mass., assignor to United Shoe Machinery Corporation, Flemington, N. J., a corporation of New Jersey Application February 28, 1946, Serial No. 651,027

12 Claims. (Cl. 177—380)

This invention relates to apparatus for use in transmitting angular or rotary movement and is herein illustrated in its application to the combination of a shaft mounted for rotary and endwise movements with an electrical system for the transmission of such rotary movement. Such a system is disclosed in United States Letters Patent No. 1,612,117, granted December 28, 1926, on an application filed in the name of Hewlett et al. This patent discloses a system commonly known as the "Selsyn system" and is characterized by transmitting and receiving devices each provided with a single phase or single circuit field winding and a polyphase or polycircuit armature winding, the armature windings being interconnected. Such a system is self-synchronous and may be employed to transmit angular or rotary movements, such as rotary movement of a shaft, to an indicating means located remotely from said shaft.

The invention is herein illustrated as embodied in an apparatus for use in submarines to transmit the periscope bearing or, more specifically, to transmit the rotary movement of the periscope. In accordance with the usual practice, receiving devices indicate the rotary movement of the periscope in terms of degrees of angular movement of the line of sight of an observer through the periscope relatively to the lubber line of the submarine.

The periscope of a submarine usually extends upwardly through a housing in the top of the hull, and the space between the periscope and the housing is sealed against the passage of sea water by suitable packings. These packings are frequently renewed and it is of course desirable that any mechanism associated with the periscope be constructed and arranged to facilitate and expedite the replacement of said packings. The transmitting devices in the illustrated organization are, of necessity, mounted close to the periscope and it is an object of the present invention to provide a construction and arrangement of said transmitting mechanism which will facilitate and expedite the replacement of said packings.

With the above object in view the invention in one aspect thereof consists in the combination with a shaft, herein illustrated as a periscope, and a bearing in which said shaft is mounted for rotary and endwise movements of means for transmitting the rotary movement of said shaft, means for imparting the rotation of said shaft to said transmitting means, means movable endwise of said shaft for mounting said rotation imparting means, an adapter permanently secured in fixed relation to said bearing, and means for removably attaching said mounting means to said adapter. In the illustrated organization the rotary movement of the shaft is transmitted by a synchronous generator which is mechanically actuated by a gear surrounding said shaft and splined thereto. In accordance with a further feature of the invention the synchronous generator is mounted in a fixed housing and the mechanism for imparting the rotation of the shaft to the generator is movable longitudinally of the shaft. In the illustrated organization the movable mechanism comprises the gear surrounding the shaft and the gear meshing therewith, the latter gear being brought into meshing relation to a gear associated with the generator by the movement of said movable assembly longitudinally of said shaft.

In accordance with a further feature of the invention the spline for transmitting the rotation of the shaft comprises a plurality of resilient members constructed and arranged for wiping engagement upon the surface of a splineway formed in said shaft, a suitable elastic member being provided for forcing the spline into wiping engagement with the surface of the splineway.

In accordance with a further feature of the invention the space between the shaft and the housing is sealed against the passage of fluid under pressure by providing a first ring mounted concentrically to the inner surface of said housing, a second ring mounted concentrically to the shaft, a first sealing member positioned between the first ring and the housing, a second sealing member positioned between the second ring and the shaft, and a third sealing member positioned between the first ring and the second ring. This arrangement obviates any adverse effects from possible eccentricity existing between the housing and the shaft.

These and other features of the invention will now be described with reference to the accompanying drawings and pointed out in the appended claims.

In the drawings,

Fig. 3 is a sectional elevation taken on a plane identified by the line III—III of Fig. 5 showing the two sections of the bearing transmitting mechanism vertically separated from each other;

Fig. 4 is a section taken on the line IV—IV of Fig. 3;

Fig. 5 is a plan view of the periscope wiper and the means for conducting the fluid removed by the wiper;

Fig. 6 is an elevation partly in section on a plane common to the axis of the periscope;

Fig. 7 is an enlarged view of a portion of the mechanism illustrated in Fig. 6;

Fig. 8 is a section on the line VIII—VIII of Fig. 6 shown on a scale larger than that of Fig. 6 but smaller than that of Fig. 7.

Figure 1:
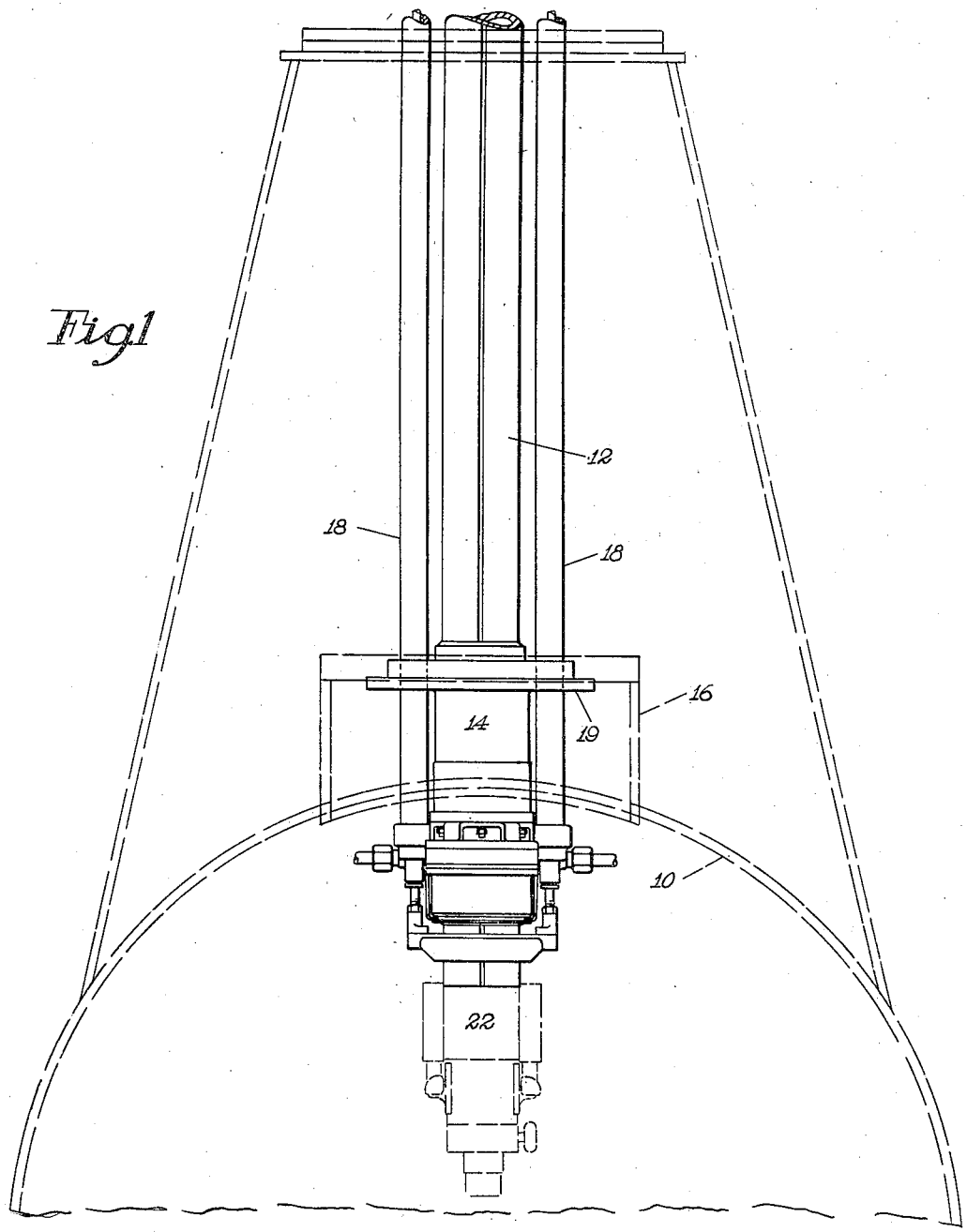
Fig. 1 is an elevation of a periscope and a periscope bearing transmitter embodying features of the present invention, a portion of a submarine in which said mechanism is mounted being indicated by broken lines.
Figure 9:
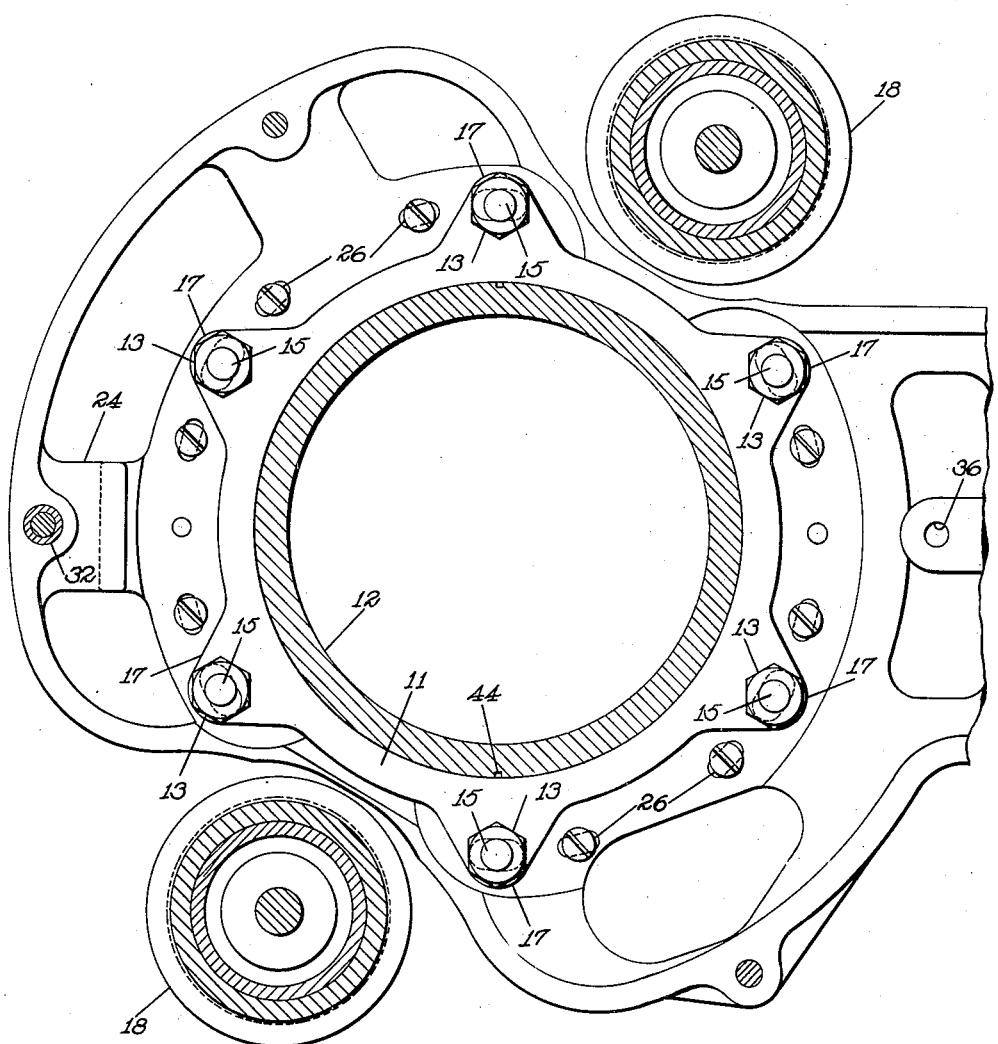
Fig. 9 is a section on the line IX—IX of Fig. 3.

In Fig. 1 the upper portion of the hull of a submarine is indicated by broken lines 10 and the lower portion of a periscope is indicated by the numeral 12. The periscope is mounted in a bearing in a cylindrical housing 14 secured to the under side of the head of a cylindrical member 16 fixed to the upper portion of the hull 10 and forming a dome in the interior of the submarine above the bearing transmitting mechanism. The space between the housing 14 and the periscope is sealed against the passage of sea water by suitable packings held in place by a packing ring 11 (Figs. 2 and 9) secured by clamping nuts 13 threaded on studs 15 fixed in said housing and extending through ears 17 in said ring. In the illustrated organization vertical movement is imparted to the periscope by a hydraulic mechanism including two cylinders 18 arranged parallel to the periscope and secured in the head 19 of the housing 14.

For transmitting the rotary movement of the periscope to an indicating mechanism conveniently located with relation to a computing machine a "Selsyn" system of known construction is provided, said system comprising two synchronous generators mechanically actuated by the rotary movement of the periscope and two synchronous motors at the indicating station connected to the generators by suitable conductors. One of said generators is operated at a 1:1 ratio to the rotary movement of the periscope and the other at a 36:1 ratio thus providing both a coarse reading and a fine reading of the periscope bearing at the indicating station. The high speed generator is indicated generally by the numeral 20 in Fig. 3. The low speed generator is not illustrated in the drawings. Both generators are mounted in a housing 22 which, in the illustrated organization, is an extension of a ring 24 secured to the lower extremity of the housing 14 by screws 26. The rotary movement of the periscope is imparted to the synchronous generators through a train of gears apart of which is mounted in the housing 22 and the remainder in a housing 30. In the illustrated organization the housing 30 is constructed and arranged for movement on the periscope in the direction of its axis in order to afford access to the space between the housing 14 and the periscope to permit the replacement of the packings which seal the periscope against the entrance of sea water. The housing 30 must be positioned accurately relatively to the surface of the periscope while being readily detachable for movement in the direction of the axis of the periscope. To this end the ring 24 is accurately positioned relatively to the periscope so that it may serve as an adapter for positioning the housing 30. Plane surfaces formed in the bottom of the ring and in the top of the housing are so constructed and arranged that they register accurately with each other upon movement of the housing upwardly into assembled position. When the ring 24 is mounted on the housing 14 care is taken to position the ring accurately with relation to the periscope so that its bottom surface will lie in a plane perpendicular to the axis of the periscope while its cylindrical inner surface is uniformly spaced from the surface of the periscope at all points.

Having accurately positioned the ring relatively to the periscope and secured it permanently to the housing 14 the accurate location of the housing 30 relatively to the periscope is assured and consequently the housing 30 may be disconnected from the ring and moved downwardly on the periscope to provide access to the packings and subsequently returned to its assembled position with no loss of time and without special attention to the relocation of the housing relatively to the periscope. The division of parts between the housing 22 and the housing 30 is such that the assembly comprising the housing 30 and its contents is relatively light and easily handled by one man. Referring to Fig. 3, the registration of the housing 30 with the ring 24 is determined by means including a tubular member 32 which registers with a counterbore 35 in an enlarged portion of the ring 24. The registration of the housing 30 with the ring 24 is further determined by the upwardly extending end portion of a shaft 34 which enters a bore 36 in an extension of the base of the housing 22 upon movement of the housing 30 upwardly from its full line position in Fig. 3 to its position indicated by the broken line showing of parts including said shaft 34.

For transmitting the rotary movement of the periscope 12 to the synchronous generator 20 and its companion generator (not shown) a gear 38 is mounted in the housing 30, said gear having a downwardly extending hub 40 in which is mounted a spline 42 (Fig. 4) slidably mounted in either of two splineways 44 extending longitudinally of the periscope and spaced 180° from each other about its periphery. The spline 42 is set into a groove in a bar 46 which is confined in a suitable recess in the lower portion of the hub 40 and retained against movement longitudinally of the periscope by a key 48 secured to the bottom edge face of the hub 40 and inserted into a notch in the lower portion of the bar 46. A leaf spring 50 carried by the bar applies a continuing pressure to the spline to retain it in the splineway. For mounting the gear 38 for rotary movement within the housing 30 three rolls 52 (Fig. 2) uniformly spaced about the periphery of the periscope operate in a channel 54 (Fig. 3) in the upper portion of the hub 40, said rolls being mounted on pins projecting inwardly from a flange 56 in the upper portion of the housing 30. For removably attaching the housing 30 to the ring 24 suitable bolts are provided one of which is identified by the numeral 58 in Fig. 2. In the illustrated organization the bolt 58 extends through the tubular member 32 and suitable bores in the outwardly extending flange of the ring 24 and the upwardly extending flange 33 of the housing 30. Referring to Fig. 3, the gear 38 surrounding the periscope meshes with a large gear 60 freely mounted on the shaft 34, the hub of said gear being supported upon the enlarged lower portion 62 of said shaft. For mounting said shaft the housing 30 has an outward extension 64 in which the enlarged lower portion of said shaft is secured and a parallel extension 68 in which the upper portion of the shaft 34 is mounted, the reduced upper extremity of said shaft projecting through the extension 68 for registration with the bore 36 in the base of the housing 22. Adjacent to the surface of the periscope the housing is grooved to receive a tongue 70 projecting upwardly from the gear 38 and serving to obstruct the flow of fluid between the gear 38 and the housing and then downwardly upon the electrical conductors hereinafter described. When the housing 30 is in its assembled position relatively to the ring 24 the extension 68 is seated in a recess 72 in the base of the housing 22. The gear 60 meshes with a small gear 78 fast on a shaft 80 journaled in bearings in the base of the housing 22. The shaft 80 extends upwardly into the interior of the housing 22 and has secured to its upper end a large gear 82 which actuates the synchronous generator 20. The shaft 80 also carries a small gear 83 which actuates a generator which does not appear in the drawings.

Figure 2:
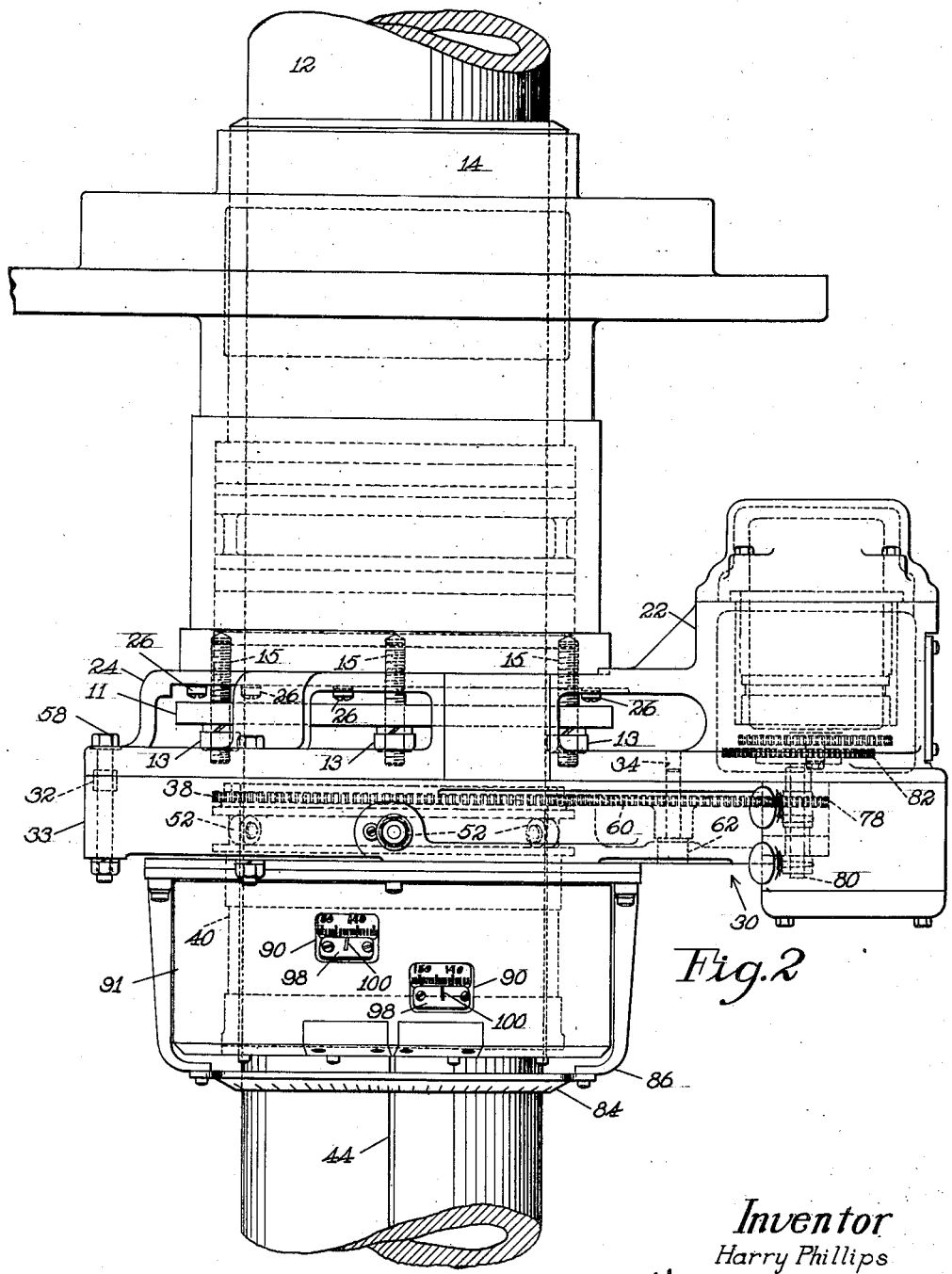
Fig. 2 is an elevation on a larger scale than Fig. 1 showing the bearing transmitting mechanism.

In order to enable the observer to determine the bearing of the periscope a cylindrical plate 88 (Fig. 3) is fixed relatively to the housing 30 and arranged in concentric relation to the periscope. Said plate has four equivalent scales spaced apart vertically and extending about its entire circumference, said scales indicating in degrees the angular relation of the direction of the line of sight of the observer to the lubber line of the submarine. The scales are offset from each other angularly so that when the reading of one scale is obstructed by one of the hydraulic pistons the reading may be taken from another scale. The illustrated construction also permits the reading to be taken by a second person stationed at the opposite side of the periscope from the observer. Referring to Fig. 2, suitable openings 90 are provided in a cylindrical housing 91 mounted to turn with the hub 40, said openings being arranged to expose the dials to the view of the reader. To facilitate reading of the dials the numerals are punched out and electric lamps 92 are provided for illuminating the area adjacent to the inner surface of the plate at the region where the reading is to be taken. In the illustrated organization light from each of the lamps 92 is reflected upon the inner surface of the plate 88 by a prism 94. The lamps 92 and the prisms 94 are mounted to move with the hub 40 of the gear 38. Also mounted on the hub 40 are four index members 96, one for each of the four scales. Each index member comprises a transparent element which receives light from one of the lamps 92 and directs it through a slit in a shield 98 at the upper extremity of the index member, the slit being indicated by the numeral 100 in Fig. 2. The illuminated slit is so arranged relatively to the scale associated therewith that it serves as an index mark whereby the periscope bearing may be read. Electricity may be conducted to the lamps 92 by any known means. In the illustrated organization the conducting means includes collector rings 102 fixed to the housing 30 and brushes mounted to rotate with the hub 40.

In the event that the dial 88 becomes unreadable because of failure of illumination or from any other cause the observer may read the bearing of the periscope on a beveled annular dial 84 secured to brackets 86 secured to the housing 30 and arranged in concentric relation to the periscope. The marks on the dial are arranged to register with the splineways in the periscope which serve as index marks.

For disposing of sea water which leaks by the packings between the periscope and the member 14 and flows down the outer surface of the periscope a wiper is constructed and arranged to direct the flow of such sea water away from the periscope and to the bottom of the hull of the submarine. Referring to Fig. 3, the illustrated wiper is an endless circular band 106 of leather or other suitable material secured to the housing 30 by screws 108 (Figs. 3 and 5) which screws also mount an annular ring 110 which serves as a shield for the wiper. Sea water directed away from the periscope by said wiper either flows directly into one of two basins 112 and 114 or is conducted into one of said basins by either of two gutters 116 and 118, said gutters being angular extensions of the ring 110. For purposes of drainage the basins 112 and 114 are provided respectively with outlet ports 120 and 122 to which there are connected conductors (not shown) which carry the water into the bottom of the hull.

Figs. 6, 7 and 8 illustrate an alternative construction comprising a spline 124 which operates in a splineway 126 in a periscope 128. For sealing the splineway against the passage of sea water the spline has a coating of rubber 130 which, as shown in Fig. 7, is corrugated widthwise of the splineway, thus providing a plurality of spaced wipers constructed and arranged to bear against the surface of the splineway. As shown in Fig. 8, the wipers and the splineway are semicircular in cross section. For pressing the spline 124 forcibly against the splineway and for sealing the outer surface of the periscope against the passage of sea water an endless sealing ring 132 of cylindrical construction is mounted in a square-cut groove 134 (Fig. 7) in a ring 136 surrounding the periscope and supported upon a ring 138 which is secured to the bearing member 14 by nuts 140 mounted on studs 141 extending through ears 142 in said ring 138. For preventing the passage of sea water downwardly upon the inner surface of the member 14 an endless sealing ring 144 of cylindrical construction is mounted in a square-cut groove 146 in a ring 148 supported upon the ring 136 and constructed and arranged to bear against the inner surface of the bearing member 14. The contacting surfaces of the rings 148 and 136 are sealed against the passage of sea water by an endless sealing ring 150 of cylindrical construction mounted in a square-cut groove in the upper surface of the ring 136. The rings 136 and 148 are constructed and arranged to permit a slight relative movement widthwise of the periscope in response to such eccentricity, if any, as may exist between the periscope and the member 14. The spline 124 is extended downwardly into the hub of the gear 38 in which it is held against vertical movement by a key 152 in the same manner as the spline 42 illustrated in Fig. 4.

Having thus described my invention, what I claim as new and desire to secure by Letters Patent of the United States is:

1. The combination with a shaft and a bearing in which said shaft is mounted for rotary and endwise movements, of means for transmitting the rotary movement of said shaft, means for imparting the rotation of said shaft to said transmitting means, means movable endwise of said shaft for mounting said rotation imparting means, an adapter permanently secured in fixed relation to said bearing, and means for removably attaching said mounting means to said adapter.

2. The combination with a shaft and a bearing in which said shaft is mounted for rotary and endwise movements, of a synchronous generator for transmitting the rotary movement of said shaft, transmission mechanism for imparting the rotation of said shaft to said generator, means surrounding said shaft and movable endwise thereof for mounting said transmission mechanism, an adapter permanently secured in fixed relation to said shaft, and means for removably fastening said mounting means to said adapter.

3. The combination with a shaft and a bearing in which said shaft is mounted for rotary and endwise movements, of means for transmitting the rotary movement of said shaft, means for imparting the rotation of the shaft to said transmitting means comprising transmission mechanism surrounding the shaft and movable upon the shaft toward and from said bearing, and an adapter permanently mounted in fixed relation to said bearing and removably attaching said transmission mechanism.

4. The combination with a shaft and a bearing in which said shaft is mounted for rotary and endwise movements, of a synchronous generator for transmitting the rotary movement of said shaft, a driven gear operatively connected to said generator, transmission mechanism for imparting the rotation of the shaft to said generator including a driving gear operatively connected to said driven gear, said transmission mechanism being movable bodily endwise of said shaft to afford access to said bearing, means permanently mounting said generator in fixed relation to said bearing, and an adapter permanently secured in fixed relation to said bearing and removably attaching said transmission mechanism.

5. The combination with a periscope and a bearing in which the periscope is mounted for rotary movement, of a synchronous generator for transmitting the rotary movement of said periscope, operating mechanism for said generator including a driven gear mounted in fixed relation to said generator, a driving gear surrounding the periscope and movable endwise of the periscope into and out of operative relation to said driven gear, a spline operatively connecting the periscope and the driving gear, a second mounting means for mounting said driving gear and said spline, and an adapter permanently secured in fixed relation to the periscope bearing and removably attaching said second mounting means.

6. The combination with a shaft and a bearing in which said shaft is mounted for rotary and endwise movements, of means for transmitting the rotary movement of said shaft, and a spline for imparting the rotation of said shaft to said transmitting means, said shaft being provided with a splineway for mounting said spline, said spline being constructed and arranged to prevent the passage of any fluid through the splineway.

7. The combination with a shaft mounted for rotary and endwise movements, and a cylindrical housing surrounding said shaft, of a spline constructed and arranged to transmit the rotary movement of said shaft, said spline being mounted in a splineway in said shaft, a first sealing ring bearing against said shaft and constructed and arranged to prevent the flow of fluid along said shaft, a second sealing ring bearing against the inner surface of said housing and constructed and arranged to prevent the flow of fluid along said housing, a synchronous generator for transmitting the rotary movement of said shaft, and means actuated by said spline for transmitting the rotary movement of said shaft to said generator.

8. The combination with a shaft constructed and arranged for rotary and endwise movements, and a cylindrical housing surrounding said shaft, of a first ring mounted concentrically to the inner surface of said housing, a second ring mounted concentrically to said shaft, a first sealing member positioned between said first ring and the housing and constructed and arranged to prevent the flow of fluid along said housing, a second sealing member positioned between said second ring and said shaft and constructed and arranged to prevent the flow of fluid along said shaft, a third sealing means positioned between the first ring and the second ring and constructed and arranged to prevent the flow of fluid between them, a spline mounted in contiguous relation to said second ring and seated in a splineway formed in said shaft, a synchronous generator for transmitting the rotary movement of said shaft, the mechanism actuated by said spline for imparting the rotary movement of said shaft to said generator.

9. The combination with a shaft and a bearing in which said shaft is mounted for rotary and endwise movements, of means for transmitting the rotary movement of said shaft, and means including a spline for imparting the rotation of said shaft to said transmitting means, said spline comprising a plurality of resilient tongues constructed and arranged for wiping engagement upon the surface of a splineway formed in said shaft.

10. The combination with a shaft and a bearing in which said shaft is mounted for rotary and endwise movements, of means for transmitting the rotary movement of said shaft, a spline for imparting the rotation of said shaft to said transmitting means, said spline comprising a plurality of spaced resilient tongues having a peripheral contour substantially complemental to the cross sectional shape of a splineway formed in said shaft, and means mounting said spline for wiping engagement upon the surface of said splineway.

11. The combination with a shaft and a bearing in which said shaft is mounted for rotary and endwise movements, of means including a spline for transmitting the rotation of said shaft, said spline comprising a plurality of resilient members constructed and arranged for wiping engagement upon the surface of a splineway formed in said shaft, and an elastic member constructed and arranged to force said spline into wiping engagement with the surface of said splineway.

12. The combination with a shaft and a bearing in which said shaft is mounted for rotary and endwise movement, of means including a spline for transmitting the rotation of said shaft, said spline comprising a plurality of resilient convex tongues constructed and arranged for wiping engagement upon the surface of a concave splineway formed in said shaft, and an elastic ring surrounding said shaft and arranged to force said spline into wiping engagement with said splineway.

HARRY PHILLIPS.

REFERENCES CITED

The following references are of record in the file of this patent:

UNITED STATES PATENTS

| Number | Name | Date |
|---|---|---|
| 1,391,652 | Meitner | Sept. 20, 1921 |
| 1,483,489 | Sperry et al. | Feb. 12, 1924 |
| 1,526,538 | Ford | Feb. 17, 1925 |
| 1,725,593 | Mobley | Aug. 20, 1929 |
| 2,085,887 | Atkinson | July 6, 1937 |
| 2,239,094 | Harvey | Apr. 22, 1941 |
| 2,393,189 | Richmond | Jan. 15, 1946 |